(12) United States Patent
Li et al.

(10) Patent No.: US 9,231,784 B2
(45) Date of Patent: Jan. 5, 2016

(54) METHOD FOR ELIMINATING REDUNDANT CONNECTIONS

(75) Inventors: Dekai Li, Yardley, PA (US); Saurabh Mathur, Bangalore (IN); Ashwin Kashyap, Plainsboro, NJ (US); Jun Gu, Hillsborough, NJ (US)

(73) Assignee: THOMSON LICENSING, Boulogne-Billancourt (FR)

( * ) Notice: Subject to any disclaimer, the term of this patent is extended or adjusted under 35 U.S.C. 154(b) by 370 days.

(21) Appl. No.: 12/312,625

(22) PCT Filed: Nov. 20, 2006

(86) PCT No.: PCT/US2006/044941
§ 371 (c)(1),
(2), (4) Date: May 19, 2009

(87) PCT Pub. No.: WO2008/063166
PCT Pub. Date: May 29, 2008

(65) Prior Publication Data
US 2009/0254667 A1    Oct. 8, 2009

(51) Int. Cl.
*H04L 12/66* (2006.01)
*H04W 76/02* (2009.01)
*H04L 29/08* (2006.01)
*H04L 12/46* (2006.01)

(52) U.S. Cl.
CPC .............. *H04L 12/66* (2013.01); *H04L 67/148* (2013.01); *H04W 76/022* (2013.01); *H04L 12/4633* (2013.01)

(58) Field of Classification Search
USPC ................................................ 709/227–229
See application file for complete search history.

(56) References Cited

U.S. PATENT DOCUMENTS

| | | |
|---|---|---|
| 6,601,101 B1 | 7/2003 | Lee et al. |
| 2002/0186676 A1 | 12/2002 | Milley et al. |
| 2004/0193705 A1 | 9/2004 | To et al. |
| 2004/0203385 A1 | 10/2004 | Narayanan et al. |

FOREIGN PATENT DOCUMENTS

| | | |
|---|---|---|
| EP | 1500244 | 1/2005 |
| EP | 1667411 | 6/2006 |
| JP | 11252615 A | 9/1999 |
| WO | WO02089441 | 11/2002 |

OTHER PUBLICATIONS

Mueller et al., "Analysis of a distributed algorithm to determine multiple routes with path diversity in ad hoc networks," Modeling and Optimization in Mobile, Ad Hoc, and Wireless Networks, WIOPT 2005, Third Int'l. Symposium, Apr. 3-7, 2005, pp. 277-285.
International Search Report, dated Aug. 13, 2007.
Maltz et al.; "Msocks: An Architecture for Transport Layer Mobility;" 1998; pp. 1037-1045.
Maltz et al., "TCP Splicing for Application Layer Proxy Performance:" IBM Research Report—RC 21139, Mar. 1998, pp. 1-13.

*Primary Examiner* — Jackie Zuniga Abad
(74) *Attorney, Agent, or Firm* — Robert D. Shedd; Jerome G. Schaefer

(57) ABSTRACT

A method and system for eliminating redundant connections, including transmitting a request to merge two connections, terminating a first portion of a first connection, terminating a first portion of a second connection, and merging a second portion of each of the first and second connections, are described. A method and system for merging connections, including receiving a request to merge two connections, terminating a first portion of a first connection, terminating a first portion of a second connection, and merging a second portion of each of the first and second connections.

4 Claims, 1 Drawing Sheet

METHOD FOR ELIMINATING REDUNDANT CONNECTIONS

This application claims the benefit, under 35 U.S.C. §365 of International Application PCT/US2006/44941, filed on Nov. 20, 2006, which was published in accordance with PCT Article 21(2) on May 29, 2008, in English.

FIELD OF THE INVENTION

The present invention relates to networking and specifically to devices using TCP/UDP connections.

BACKGROUND OF THE INVENTION

The development of networking technologies facilitates the communication of various devices and makes it possible for an application to involve multiple devices. These devices, usually designed for different purposes, have different computing capabilities, memory capacity and power consumption. As a result, there are different requirements for these devices when they are involved in an application, such as file sharing and file downloading.

FIG. 1 illustrates an exemplary home networking environment in which a wireless access point is connected to the Internet (via a Network Address Translation (NAT) based router (network translation device)). There are also a network attached storage (NAS) device (destination storage device/storage device), a desktop computer and several wireless clients, e.g. laptop, personal digital assistant (PDA). As used herein "/" should be interpreted as denoting alternative names for a component. A file sharing application, in an exemplary environment as depicted in FIG. 1, involves four devices: the remote file (data) server (source data server/source device), the network attached storage (NAS), an access point and at least one mobile client (e.g. laptop or PDA). While the laptop and PDA are equipped with powerful CPUs and user friendly interfaces, they are not designed to be powered on all the time. On the other hand, the wireless access point and the NAS are usually small embedded systems with slower CPUs and less memory. They are powered on most of the time.

The communication protocol used by these devices is usually TCP. However, the end-to-end nature of TCP ties all participating devices together and requires them to be active for the duration of a session. Yet, not all devices are required all of the time. For example, a PDA may be used to initiate a file downloading. What is really desired is that the file is directly downloaded from the remote file (data) server (source device) to the NAS disk (storage device) such that the PDA can be suspended when the download begins. It may not be possible to instruct the NAS to do that directly for several reasons. First, the NAS might be a dumb device, which cannot be controlled to initiate connections. Second, the initial connection setup process might require complex authentication and thus human interaction, for example, filling in user name and password, interpreting a script (e.g. java script), or solving a graph puzzle.

Conventionally, multiple connections are set up and maintained in order for the application to work properly. However, there are several disadvantages with this approach. First, the requirement that all participants be active during a session limits the mobility of mobile devices. No device can be disconnected or suspended because the proper function of the application relies upon the active TCP end points/devices. However, it is not usually desirable to keep those devices powered on all the time. For example, it might be necessary or desirable to take the notebook computer to work or the PDA might have limited battery life. Second, redundant connections consume more resources. Power is consumed keeping those devices active; extra bandwidth is required to transmit data between devices; CPU cycles are required to perform checksum calculation; memory is required for buffering packets. Finally, the redundant connections usually do not increase the reliability and performance of the application but to the contrary, redundant connections introduce more points of failure, more bottle neck links and higher latency. For example, a wireless connection is often susceptible to packet loss and connection drop. The more wireless links an application involves, the less reliable the data communication actually is.

In prior art approaches, proxies were deployed on the network address translation device. A connection to the outside can be made and kept by the proxy. Multiple devices can first connect to the network address translation device and request the same connection. So a mobile device can set up a connection and instruct another device to use this connection. However, this approach only enables sharing of a connection among certain hosts; it does not decrease the number of connections. Moreover, some dumb devices (e.g. NAS) might not even be able to initiate a connection to the network address translation device. Furthermore, due to the extra number of connections on the network address translation device, the network translation device requires more resources, e.g. data copy and checksum calculation, packet buffering, etc. TCP splicing is a similar prior art approach, but its focus is on improving proxy performance for a connection between a client and a server. It only involves three devices: client, server and proxy. Msocks, another prior art approach, makes use of TCP splicing to solve the mobility problem of the same device, i.e. when a host moves, its connection is maintained at transport level. Msocks also requires changing the application on the mobile device to link with a special library.

SUMMARY OF THE INVENTION

The present invention is directed towards a method to eliminate redundant TCP/UDP connections when multiple devices are involved in an application, which enables the transparent migration of a communication session from one device to another and facilitates the mobility of mobile devices.

The method according to the present invention has many advantages including no restrictions on the mobile device's TCP implementation. In order for two connections to match so that they can be merged, the connections should have similar extension features, e.g. window scale, selective acknowledgement, time stamp. It is possible to implement some of these features on the network address translation device with some extra overhead.

A method and system for eliminating redundant connections, comprising: transmitting a request to merge two connections, terminating a first portion of a first connection, the first connection effecting communications between a first device and a second device, terminating a first portion of a second connection, the second connection effecting communications between the first device and a third device, wherein each of the first and second connections is effected through a fourth device and merging a second portion of each of the first and second connections, are described. A method and system for merging connections, comprising receiving a request to merge two connections, terminating a first portion of a first connection, the first connection effecting communications between a first device and a second device, terminating a first portion of a second connection, the second connection effecting communications between the first device and a third device, wherein each of the first and second connections is effected through a fourth device and merging a second portion of each of the first and second connections, are also described. It should be noted that the present invention is described in terms of the connections portions being connection halves.

A method and system for merging connections, comprising terminating a first mapping between a first device and a second device, terminating a second mapping between the first device and a third device and creating a mapping between the second device and the third device, are also described.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1:
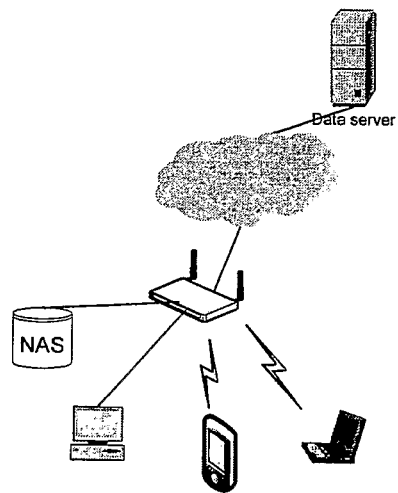
FIG. 1 illustrates an exemplary home networking environment.

FIG. 1 illustrates an exemplary home networking environment in which a wireless access point is connected to the Internet. The access point can be directly connected to the Internet or it can be connected via a Network Address Translation (NAT) based router (network address translation device). There are also a network attached storage (NAS) device (destination storage device), a desktop computer and several wireless clients, e.g. laptop, PDA. A file sharing application, in an exemplary environment as depicted in FIG. 1, involves four devices: the remote file (data) server, the network attached storage (NAS) device, an access point and at least one mobile client (e.g. laptop or personal digital assistant (PDA)). While the laptop and PDA are equipped with powerful CPUs and user friendly interfaces, they are not designed to be powered on all the time. On the other hand, the wireless access point and the NAS are usually small embedded systems with slower CPUs and less memory. They are powered on most of the time.

The present invention is directed to data/file sharing or data/file downloading type applications having redundant connections, which typically occurs with both TCP and UDP communication protocols. For most data/file sharing or file downloading applications, data is not urgently needed as in interactive applications although the present invention may also be used with streaming and VoIP applications. It is noted that while the present invention is described in terms of file/data downloading, the present invention will work as well for file/data uploading applications, in which case the roles of the devices will be reversed. The source device becomes the destination device and vice versa.

Figure 2:
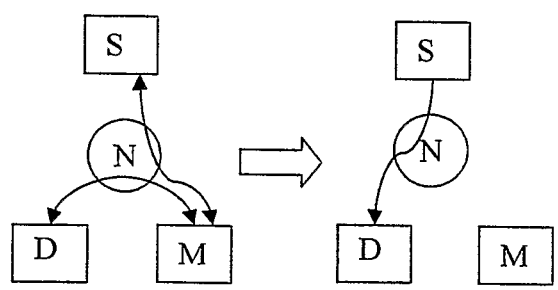
FIG. 2 is a schematic diagram of the connection merge process in accordance with the principles of the present invention.

In one embodiment, the present invention addresses TCP-based applications. Referring to FIG. 2 where a mobile device initiates a connection to a source data server (source device) S using a first connection and saves the content to a destination storage server/storage device D using a second connection. Both connections go through the network address translation device. That is, the connection between the mobile device and the source device goes through the network address translation device as does the connection between the mobile device and the storage device. After connection establishment, the mobile device requests the network address translation device to merge these two connections such that the source device S directly transfers data to the storage device D. It should be noted that the connections in FIG. 2 have double headed arrows indicating that communication is in both directions. The following symbols are used in the description of the method of the present invention.

S: Source device/source data server
M: Mobile device
D: Destination storage server/storage device
N: network address translation host/network address translation device A tuple is defined to record protocol state information for each direction of a connection. The tuple consists of two fields:

$T(snd\_max, ack\_max)$

The tuple records the maximum sequence number and maximum acknowledgement number seen by the network address translation device for one direction of a connection. Each tuple can be thought of as a delayed mirror of the corresponding device's protocol states. However, different from an end device, which must maintain the correctness of the states, the network address translation device only keeps a record. For example, the end device must buffer out-of-sequence packets, while the network address translation device does not buffer any packets during normal operation. The state can, therefore, be said to be delayed because there are still packets within the network between the end devices and the network address translation device. The advantage of this approach is that the protocol complexity is kept at the end device without requiring a proxy on the network address translation device.

There are four tuples used on the network address translation device in the set up in accordance with the principles of the present invention.

$T_{sm}$: Tuple for half-connection from source host to mobile device $T_{ms}$: Tuple for half-connection from mobile host to source device $T_{md}$: Tuple for half-connection from mobile host to destination device $T_{dm}$: Tuple for half-connection from destination host to mobile device These four tuples correspond to the two connections, ($T_{ms}$, $T_{sm}$) for connection between source device and mobile device via the network address translation device and ($T_{md}$, $T_{dm}$) between mobile device and destination/storage device via the network address translation device. Thus, during set up, the mobile device initiates a first connection to the source device (source data server or data server). Then the mobile device initiates a second connection to the storage device. These two steps can be interchanged. The mobile device then obtains the file/data from the source device. Finally, the mobile device forwards the file/data to the storage device.

When the mobile device decides to merge these two connections, the mobile device first sends a message to the network address translation device indicating the two connections to be merged and the way of merging, in this case, eliminating the connections that involve mobile device. The network address translation device waits for unacknowledged data to be acknowledged and then terminates the mobile device's side of the connection between mobile device and the source device. After processing the buffered data received, the mobile device sends another message to the network address translation device, indicating the end of communication with the storage device. Upon receiving the second message, the network address translation device can start merging the connections. The connections are merged in stages as follows:

Stage 1: Normal Operation

On the network address translation device, protocol information needs to be tracked for every connection that might be merged with another connection. Starting from the sequence number of the packet with SYN flag set, the highest sequence number and acknowledgement number that the network address translation device has seen is recorded, although the other side might not have received all preceding packets due to packet loss or reorder. The end device will handle retransmission of lost packets. For example, a packet $P_{sm}$ sent from the source device to the mobile device with sequence number $P_{sm}$.seq and acknowledgement number $P_{sm}$.ack updates the corresponding tuple as follows:

$$\text{If } ( T_{sm}.\text{snd\_max} < P_{sm}.\text{seq} )$$
$$T_{sm}.\text{snd\_max} = P_{sm}.\text{seq};$$
$$\text{If } ( T_{sm}.\text{ack\_max} < P_{sm}.\text{ack} )$$
$$T_{sm}.\text{ack\_max} = P_{sm}.\text{ack};$$

Stage 2: "Terminating" the First Connection

When the mobile device requests merger of the two connections, it sends a message to notify the network address translation device. The network address translation device then freezes the two tuples for the first connection between the mobile device and source device. From this point in time forward, only packets with lower sequence number and acknowledge number can be forwarded between them. These packets are either delayed within the network or retransmitted because of errors. If the sequence number of certain payload goes beyond "snd_max" of the corresponding tuple, the payload is truncated. Because both the mobile host/device and the source host/device cannot see larger sequence numbers than the maximum sequence number seen by the network address translation device, packets with acknowledgement number larger than "ack_max" of the corresponding tuple are dropped. Because the time it takes to perform the merge operation should be less than the timeout value of TCP, the end devices should be able to detect the dropped packets as lost and perform retransmission. As an implementation improvement, the network address translation device could choose to buffer some packets with payload beyond "snd_max" depending on the network address translation device's available memory.

After packets are correctly received, network address translation device initiates an active close and sends a FIN to the mobile device. From the mobile device's point of view, the connection is terminated. The network address translation device then waits for the FIN, ACK from the mobile device and then the network address translation device sends the final ACK. That is, the half of the connection between the mobile device and the source device, where the mobile device receives data from the source device is terminated.

Stage 3: "Terminating" the second connection

The mobile device continues processing the buffered data from the source device and then sends a message to the network address translation device indicating an end of connection with the storage device. This message is defined by the application and sent after all data sent to the storage device has been acknowledged. That is, the half of the connection between the mobile device and the storage device, where the storage device receives data from the mobile device is terminated.

In another embodiment the mobile device sends a packet with FIN to the storage device. In this embodiment, the network address translation device intercepts the FIN message without forwarding it to destination. This is essentially a passive close and the network address translation device responds to the mobile device with FIN and ACK and waits for the final ACK from the mobile device. If the application sends a message without using a FIN message, the network address translation device terminates the half connection to the mobile device like in the previous stage.

In this stage, the tuples for the second connection are updated until the terminating message or a packet with a FIN message is received. Then the tuples for the second connection are frozen. From this point in time, only packets with a sequence number less than snd_max and an acknowledge number less than ack_max are accepted as in the previous stage.

After terminating the mobile device's half of the connection between mobile device and storage device, the network address translation device creates a new mapping between the storage device and the source device and prepares to forward packets between them. If a FIN message is used to terminate the connection, snd_max is specified as the sequence number of FIN minus one.

Stage 4: Completion of Merging

The sequence number and thus acknowledgement number of these two connections are independent. Packets cannot merely be forwarded directly between the source device and the storage device. The packets need to be modified so that they appear to be from the mobile device, even though it is now not involved in these two connections. For example, for packets coming from the source device, the source device sending sequence space is mapped to the sending sequence space used by the mobile device to send packets to the storage device. The acknowledgements are also modified so that they fall into the sending space used by the storage device. The sequence number is modified as follows:

$$P_{sm}.\text{seq}=P_{sm}.\text{seq}-T_{sm}.\text{snd\_max}+T_{md}.\text{snd\_max};$$

The ACK is modified as follows:

$$P_{sm}.\text{ack}=P_{sm}.\text{ack}-T_{ms}.\text{snd\_max}+T_{dm}.\text{snd\_max};$$

The detailed operations for packets from the source device to the mobile device are as follows:

$P_{sm}.\text{dst\_ip}=D.\text{ip}$ (change the destination ip to the destination (storage device))

$P_{sm}.\text{dst\_port}=D.\text{port}$ $P_{sm}.\text{src\_ip}=M.\text{ip}$ $P_{sm}.\text{src\_port}=M.\text{port}$ (the port used to communicate with $D$)

$P_{sm}.\text{seq}=P_{sm}.\text{seq}-T_{sm}.\text{snd\_max}+T_{md}.\text{snd\_max}$ $P_{sm}.\text{ack}=P_{sm}.\text{ack}-T_{ms}.\text{snd\_max}+T_{dm}.\text{snd\_max}$ The third and fourth instructions together fool the destination (storage device) to think the data/file is from the mobile device but the data/file is actually coming from the source device.

The detailed operations for packets from the storage device to the mobile device are as follows:

$P_{dm}.\text{dst\_ip}=S.\text{ip}$ $P_{dm}.\text{dst\_port}=S.\text{port}$ $P_{dm}.\text{src\_ip}=N.\text{ip}$ $P_{dm}.\text{dst\_port}=N.\text{port}$ $P_{dm}.\text{seq}=P_{dm}.\text{seq}-T_{dm}.\text{snd\_max}+T_{ms}.\text{snd\_max}$ $P_{dm}.\text{ack}=P_{dm}.\text{ack}-T_{md}.\text{snd\_max}+T_{ms}.\text{snd\_max}$ What the above operations accomplish is the merger of the other (second) half of each of the first and second connections. That is, the source device sends the data/file/packets to the storage device via the network address translation device, which modifies the packet headers so that it appears to the storage device that the data/packets are coming from the mobile device, which is no longer involved. This effectively merges or terminates the communication from the mobile device to the source device and from the storage device to the mobile device.

It is noted that N.port is the port visible to the remote data source server (remote source device). Depending on the network address translation device implementation, it might be different from the port used by the mobile device to connect to the source device. M.port is the port visible to the storage device. In the above example, the storage device is within the same network as the mobile device, so M.port is the same port used by the mobile device. After the above modifications, the checksum of TCP header and IP header are calculated or incrementally re-calculated.

In another embodiment, applications use UDP as the transport protocol. The mobile device first connects to the source device and the network address translation device maintains a mapping between the UDP port used by the mobile device and the port used by the source device. When the mobile device decides to migrate a session to storage device, the mobile device first activates a UDP session to the storage device (either the mobile device or the storage device can initiate the session depending on the implementation.) Then the mobile device instructs the network address translation device to change the mapping between the mobile device M and the source device S to a mapping between the storage device D and source device S.

For packets being transmitted from the source device to mobile device, the network address translation device performs the following operations:

$P_{sm}.\text{src\_ip}=M.\text{ip}$ $P_{sm}.\text{src\_port}=M.\text{port}$ (the port used to communicate with $D$)

$P_{sm}.\text{dst\_port}=D.\text{port}$ $P_{sm}.\text{dst\_ip}=D.\text{ip}$

For packets being transmitted from the storage device to the mobile device, the network address translation device performs the following operations:

$P_{dm}.\text{dst\_ip}=S.\text{ip}$ $P_{dm}.\text{dst\_port}=S.\text{port}$ $P_{dm}.\text{src\_ip}=N.\text{ip}$ $P_{dm}.\text{dst\_port}=N.\text{port}$ Besides the file sharing application illustrated in the method according to the present invention, the method of the present invention has other applications, for example, as follows:

1. Transparently switching a streaming session from one device to another. Using the method of the present invention, a streaming client that allows users to start watching a streaming video from a personal computer (PC) or PDA can later migrate it to a TV (or TV with set-top box) that also uses TCP/UDP. If the streaming application only uses TCP, (e.g. RTP over RTSP), the mobile device first transfers the application state to the storage device and then migrates the TCP connection to the storage device. If the streaming application uses TCP (e.g. RTSP) and UDP (RTP), the mobile device first transfers the application states (RTSP state) and RTP state to the storage device and then migrates the TCP and UDP connections to the storage device.
2. Transparently switching from "viewing" a streaming session to "storing" the stream to local storage. This application is similar to the one described above except that the storage device stores the stream in local storage instead of rendering/displaying it on a device, e.g. TV.
3. Transparently switching a VoIP call from one device to another, or from one user's phone to another user's phone. This application is similar to the above two applications and is also implemented by first transferring the application state to storage device and then migrating the TCP/UDP connection.

For applications that do not use additional states or only use some states at the beginning of a session, the applications running on both the mobile device and the storage device can remain unchanged. However, for applications that must maintain some states during the session, the applications must be modified to transfer those states and use the method according to the present invention as described herein to migrate the underlying connection.

To initiate the merging of connections, the network address translation device can provide a common gateway interface (CGI)-based web interface. The client can access the CGI scripts to get a list of currently tracked connections and indicate the connections that the network address translation device should merge. Another embodiment is to deploy a daemon process on the network address translation device and define a communication interface for the mobile device to send merging instructions.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method comprising:
   initiating a first connection by a first device to a source device using said first connection to obtain content from said source device;
   initiating a second connection by said first device to a second device using said second connection to forward said content from said source device to a second device through said first device using said first and said second connections; and
   transmitting a request by said first device to a network address translation device to merge said first and said second connections, and in response to said request, a first portion of said first connection and a first portion of said second connection are terminated by said network address translation device and only packets with lower sequence numbers and lower acknowledgement numbers than a maximum sequence number and a maximum acknowledgement number recorded are to be forwarded between the first device and the source device by said network address translation device; and a second portion of said first and second connections are merged by said network address translation device, and wherein a packet header of a packet is modified such that said packet received at said second device appears to have been transmitted by said first device.

2. A method performed by a network address translation device comprising:
   receiving a request from a first device, said first device having a first connection to a source device for obtaining content from said source device and a second connection to a second device for forwarding said content from said source device to said second device through the first device;
   in response to said request, terminating a first portion of said first connection, terminating a first portion of said second connection and wherein packets with lower sequence numbers and lower acknowledgement numbers than a maximum sequence number and a maximum acknowledgement number recorded are to be forwarded between the first device and the source device by said network address translation device; and
   merging a second portion of said first and second connections wherein a packet header of a packet is modified such that said packet received at said second device appears to have been transmitted by said first device.

3. The method according to claim 2, wherein terminating said first portion of said second connection further comprises:
   updating information regarding a protocol state between devices communicating via said second connection; and
   receiving a message from said network address translation device indicating an end of communication between said first device and said source device.

4. The method according to claim 3, further comprising creating a new mapping between said second device and said source device.

* * * * *